Patented June 17, 1952

2,600,454

UNITED STATES PATENT OFFICE 2,600,454

RESINOUS MATERIALS FROM 1,2-DI-METHYLENECYCLOHEXANES

John E. Wicklatz, Bartlesville, Okla., and James N. Short, Cincinnati, Ohio, assignors to Phillips Petroleum Company, a corporation of Delaware No Drawing. Application November 15, 1948, Serial No. 60,172

10 Claims. (Cl. 260—83.7)

This invention relates to new polymeric materials. One aspect of this invention relates to the polymerization of selected 1,2-dimethylenecyclohexanes. Another aspect of this invention relates to the polymerization of a mixture containing one or more selected 1,2-dimethylenecyclohexanes and at least one other organic compound containing one or more double bonds per molecule. In another embodiment this invention relates to the manufacture of high molecular weight resinous polymers by a method involving the polymerization of a 1,2-dimethylenecyclohexane alone, or together with at least one other organic compound having one or more double bonds per molecule.

The polymerization of butadiene and its homologues, analogues, and derivatives, either alone or in admixture with other unsaturated materials, such as styrene, acrylonitrile, acrylic acid and the like, has long been known. In accordance with the present invention a new class of reactants, 1,2-dimethylenecyclohexanes, is used in such a process. These 1,2-dimethylenecyclohexanes have a composition in accordance with the following structural formula:

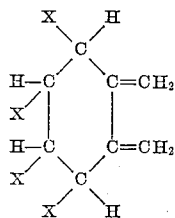

where any X is selected from the group consisting of hydrogen, methyl, ethyl, n-propyl, i-propyl, n-butyl, i-butyl, methoxy, ethoxy, propoxy, butoxy, the total number of carbon atoms in the preceding X radicals being not greater than 12, phenylmethyl, phenylethyl, phenylisopropyl, phenyl-n-propyl, phenylisobutyl, phenyl-n-butyl, phenyl, methylphenyl, ethylphenyl, isopropylphenyl, n-propylphenyl, chlorophenyl, bromophenyl, fluorophenyl, the total number of phenyl-containing radicals in the preceding X radicals being not greater than 3, and chloro, bromo, fluoro. These new compositions and methods for their preparation are disclosed in our co-pending application, Substituted Cyclohexanes, Serial No. 60,173, filed November 15, 1948. Hereinafter when referring broadly to a 1,2-dimethylenecyclohexane it is meant any 1,2-dimethylenecyclohexane having a composition in accordance with the structural formula discussed hereinabove.

An object of this invention is to provide new and useful resinous polymeric compounds.

Another object is to provide a method for the manufacture of new and useful resinous polymers.

Another object is to polymerize selected 1,2-dimethylenecyclohexanes.

Another object is to provide a method for the manufacture of new resinous polymers wherein a selected 1,2-dimethylenecyclohexane is used as a starting monomeric material.

Another object is to provide a method for the manufacture of new resinous polymers wherein a 1,2-dimethylenecyclohexane is polymerized.

Still another object is to provide a process for the manufacture of new resinous materials by the polymerization of a mixture containing at least one 1,2-dimethylenecyclohexane and at least one other polymerizable organic material.

It is yet another object to provide a process for the manufacture of a resinous material, wherein a 1,2-dimethylenecyclohexane is copolymerized with at least one organic compound copolymerizable therewith.

Other objects will be apparent to one skilled in the art from the accompanying discussion and disclosure.

We have discovered new high molecular weight polymers prepared from 1,2-dimethylenecyclohexanes of the type described hereinabove. We have found that such a 1,2-dimethylenecyclohexane will undergo polymerization in a substantially pure state, mixed with other such 1,2-dimethylenecyclohexanes or admixed with other unsaturated reactive materials, as will be discussed, to produce materials which include viscous sticky liquids, plastic polymers, and brittle resins. Polymerization reactions of this invention may be effected in any one of a number of different methods, the product produced by each method having properties which result not only from a choice of reactants but from a choice of polymerization conditions. The polymerization may be conducted in aqueous emulsion, or in a homogeneous system, in the presence of various polymerization catalysts of the type used in the production of polymeric products of high molecular weight. Among these catalysts are such types as alkali metals, acids, oxygen-yielding compounds and Friedel-Crafts and such other polymerization catalysts known in the art, not specifically included in the above classification. In any case, various small amounts of inert diluents such as a paraffinic hydrocarbon may be present but should be kept at a minimum to avoid uneconomical operation.

1,2-dimethylenecyclohexanes utilized herein are conjugated diolefins, and we have found that they are capable of undergoing polymerization reactions in a manner similar to those of other conjugated diolefins. The 1,2-dimethylenecyclohexanes of this invention may be polymerized alone or with one or more monomers copolymerizable therewith such as aliphatic conjugated diolefins, particularly comonomers which contain the characteristic structure

and, in most cases, have at least one of the disconnected valences attached to an electronegative group, that is, a group which increases the polar character of the molecule, such as a chlorine group or an organic group containing a double or triple bond such as vinyl, phenyl, cyano, or the like. Included in this class of monomers are the conjugated butadienes or 1,3-butadienes such as butadiene (1,3 - butadiene), 2,3 - dimethyl - 1,3 - butadiene, isoprene, piperylene, 3 - furyl - 1,3 - butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnapthalene and similar derivatives thereof, and the like; nitriles, amides and esters of acrylic and substituted acrylic acids, such as methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described.

In one embodiment of our invention a 1,2-dimethylenecyclohexane is reacted with a tertiary-base olefin. The most common example of such an olefin is isobutylene, although often 2-methylpentene-1, 2-ethylpentene-1, and 2-methylhexene-1, may be used. In such reactions it is preferred to employ a polymerization catalyst of the Friedel-Crafts type, and to conduct the reaction at a temperature, preferably within the limits of —50 and about —250° F. Preferred mole ratios of tertiary-base olefin to a 1,2-dimethylenecyclohexane are within the range of 200:1 to 5:1 although a mole ratio outside such a range is within the scope of our invention. Along with a 1,2-dimethylenecyclohexane, in such reactions, may be employed a diolefin hydrocarbon such as butadiene, isoprene, piperylene or the like. There may also be included in the reaction mixture, along with or in place of the diolefin hydrocarbon, a low-melting methylene nitrile such as, for example, acrylonitrile or methacrylonitrile. The reaction is preferably carried out in the presence of a solvent, such as liquid ethylene or liquid ethane. When a solid Friedel-Crafts type metal halide catalyst such as aluminum chloride or aluminum bromide is used, it is preferred that it be dissolved in an inert solvent such as an ethylene halide, preferably ethylene chloride or bromide. The reaction mixture is maintained thoroughly mixed and at the end of the desired extent of polymerization, the reaction can be quenched by the addition of material to kill the activity of the catalyst, such as ammonia, an alcohol, an ether or a ketone, or the like.

As will be appreciated by those skilled in the art, the above described procedure is similar to that which is well known for the production of so-called "butyl rubber" wherein a low boiling tertiary-base olefin and a minor amount of a diolefin hydrocarbon are reacted at low temperatures, in the presence of a Friedel-Crafts type metal halide catalyst. Either batch, semi-batch or continuous processes may be used.

In another embodiment of our invention a 1,2-dimethylenecyclohexane is reacted with itself or with other polymerizable unsaturated organic compounds in aqueous emulsion. There are several classes of materials which can take part in such reactions, as will now be briefly discussed.

One class of materials is that represented by styrene and its homologues and analogues. Preferred reactants are styrene, vinylnaphthalene, vinyltoluene, vinylmethylnaphthalene, vinylchlorobenzene and the like. It is preferred that such reactants contain not more than 14 carbon atoms per molecule, and in most instances the simpler materials such as styrene, and vinyltoluene, and the like will be used. Preferred products are produced when the molecular ratio of the selected 1,2-dimethylenecyclohexane to such vinyl aromatic compounds is between 1:1 and about 9:1, although mole ratios outside such a range are within the scope of our invention. The reaction is carried out in the presence of an aqueous medium and a polymerization cataylst, together with suitable polymerization initiators, emulsification agents, and reaction modifiers, as is well known in the art in producing rubbers of the GR-S type. At the end of a desired extent of reaction, the reaction can be stopped by the addition of a suitable material to kill the activity of the catalyst, such as phenyl-beta-naphthylamine.

Another type of reactant than can be employed along with a 1,2-dimethylenecyclohexane of this invention in emulsion polymerization is a material having the structure of a low-boiling conjugated diolefin, such as 1,3-butadiene, isoprene, piperylene, chloroprene, chloroisoprene and the like, preferably having not more than 7 carbon atoms per molecule. When such a material is used, the preferred mole ratio of the selected 1,2-dimethylenecyclohexane to the diolefin hydrocarbon is between about 10:1 and about 1:10, although a mole ratio outside the preferred range is within the scope of our invention. The reaction is carried out in aqueous emulsion under conditions similar to those well known to those skilled in the art.

In another preferred embodiment of our invention a 1,2-dimethylene-cyclohexane is copolymerized in aqueous emulsion with a low-boiling alpha-methylenenitrile, such as acrylonitrile, methylacrylonitrile, ethacrylonitrile, butacrylonitrile, alpha-chloroacrylonitrile, alpha-methoxy-methylacrylonitrile, alpha-chloroethylacrylonitrile, alpha-phenylacrylonitrile, alpha-cyclohexylacrylonitrile, or in general, any nitrile having a methylene group ($CH_2=$), attached to a carbon atom alpha to a nitrile group as in the structure in

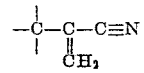

regardless of the nature of the radical to which this structure is connected. It is preferred that such a reactant contain not more than 10 carbon atoms per molecule and that the mole ratio of 1,2-dimethylenecyclohexane to alpha-methleneacrylonitrile be between about 1:1 and about 9:1, although a mole ratio outside the preferred range is within the scope of our invention. The reaction conditions will be similar to those used in the art to produce Perbunan-type synthetic rubbers.

Still another embodiment of our invention involves the emulsion copolymerization of a 1,2-dimethylenecyclohexane with esters of acrylic acid and substituted acrylic acids. It is preferred that the materials of this type which are employed in the practice of this invention contain not more than 10 carbon atoms per molecule and that the mole ratio of the 1,2-dimethylenecyclohexane to such a reactant be between about 1:1 and about 9:1, although a molar ratio outside the preferred range is within the scope of our invention. The reaction conditions employed for such embodiments of our invention will be similar to those in the art where low-boiling diolefins are reacted with such materials in aqueous emulsion.

In such emulsion polymerizations it is to be understood that various combinations of reactants may be employed. Thus, a 1,2-dimethylenecyclohexane can be employed alone or together with more than one butadiene hydrocarbon or derivative, or more than one representative of the other classes of reactant materials discussed herein, or more than one representative of such classes of reactants may be employed. Thus, desirable products are produced by copolymerizing a 1,2-dimethylenecyclohexane, butadiene, and acrylonitrile and methyl acrylate; by copolymerizing the 1,2-dimethylenecyclohexane, styrene, and methyl acrylate, and by copolymerizing other mixtures of reactants as discussed herein. In each instance a plurality of molecules of each reactant enters into the formation of resinous product having unique properties, and it is not to be construed that equivalent products are produced from different reaction mixtures.

In such emulsion polymerization a reaction temperature between about −20 and about 175° F. may be employed, more preferably from about 32° F.–122° F. It is preferred that a greater amount of aqueous medium be employed than the amount of total reactants employed. When employing subfreezing temperatures, a suitable antifreeze agent should be used. The same type of emulsifying agents and reactants can be employed as are known to be used in the production of various synthetic rubbers. The polymerizations can be conducted at atmospheric pressure but will preferably be conducted at a super-atmospheric pressure sufficient to maintain reactants in liquid phase under the reaction conditions. Suitable reaction times will be readily found by a simple trial for each set of reaction conditions including not only reactants, ratio of reactants to each other, ratio of total reactants to emulsifying medium, pressure, and temperature, but also catalyst employed, degree of agitation, polymerization initiator, polymerization modifier and the like. Preferred catalysts would be those having oxidizing characteristics such as have been used for the production of synthetic rubbers. These catalysts include inorganic material such as potassium persulfate, hydrogen peroxide, and organic peroxides and hydroperoxides.

Diazo thioethers are also suitable polymerization catalysts, or initiators, in the practice of this invention and may be employed in either heterogeneous or homogeneous systems. The diazo thioethers that may be used in the process of this invention have the general structural formula R—N=N—S—R', where R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. These diazo thioethers may be prepared by the combination of a diazotized aromatic amine and an aromatic, cycloalkyl, or aliphatic mercaptan, including substituted derivatives. Examples of these compounds are substituted benzene diazo mercapto naphthalenes, benzene diazo mercapto benzenes, naphthalene diazo mercapto benzenes, and naphthalene diazo mercapto naphthalenes. Substituent groups which may be employed are the alkyl, alkoxy, aryloxy (e. g., phenoxy), carboxy, sulfonic acid, halo and nitro groups. Other substituents give diazo thioethers of varying degrees of usefulness. Among the diazo thioethers which may be conveniently employed in my process the following compounds are included, 2-(p-methoxybenzene diazo mercapto)-naphthalene, 1-(p-methoxybenzene diazo mercapto)-naphthalene, 2-(dimethylbenzene diazo mercapto)-naphthalene, 2-(p-chlorobenzene diazo mercapto)-naphthalene, 2-(p-methylbenzene diazo mercapto)-naphthalene, and the coupling products of diazotized sulfanilic acid with thio-p-cresol and thio-beta-naphthol. The diazo thioethers herein described may be either the water soluble or oil soluble type. Among preferred diazo thioethers compounds are those more fully described in an application by Reynolds and Cotten, Serial No. 641,866, filed January 17, 1946, now U. S. Patent 2,501,692 issued March 28, 1950. Batch, or semi-batch, or continuous polymerization may be employed as desired or as available facilities permit.

The preceding discussion covers the preferred embodiments of our invention, but it is to be understood that other embodiments of our invention can be practiced outside the scope of the foregoing discussion. A 1,2-dimethylenecyclohexane may be polymerized with one or more of the foregoing comonomers, at atmospheric or elevated temperatures in the absence of emulsification media, in a so-called homogeneous state. Alkali metal catalysts, particularly sodium, may be employed to advantage in the homogeneous polymerization of a 1,2-dimethylenecyclohexane, under conditions similar to those originally used to produce the buna-type rubbers. Other comonomers may be used such as vinylacetylene, divinylacetylene, various non-hydrocarbon vinyl derivatives as vinyl chloride, vinylidene chloride, vinyl acetate and the like.

Products produced in the foregoing disclosed embodiments of our invention are oily or normally plastic solid materials, and many of the solids are thermoplastic, and can be milled on a warm mill. Some solid materials are resinous and have fiber like tendencies, i. e., they can be drawn into long fibers having high tensile strength. In some instances the products of our invention are of a soft texture, and in some cases a viscous sticky liquid may be produced.

The resinous polymers of this invention are suitable for a variety of uses, depending upon the type of material produced. For example, the solid products may be employed in the manufacture of various types of molded articles and the softer materials may be used as plasticizing agents. The liquid oil polymer products may especially be used as drying oils and as plasticizers.

Our invention will be further illustrated and defined by the following examples. The reactants and their proportions and other specific ingredients are presented as being typical and should not be construed to limit the invention unduly.

*Example I*

The production of a resin by the copolymerization of 1,2-dimethylenecyclohexane with styrene was carried out according to the following recipe:

| | Parts by weight |
|---|---|
| 1,2-dimethylenecyclohexane | 75 |
| Styrene | 25 |
| Primary dodecyl mercaptan | 0.5 |
| Water | 180 |
| Potassium persulfate | 0.3 |
| Soap flakes | 5 |

A mixture of the potassium persulfate, soap flakes, and water was charged to the reactor after which a mixture of the styrene, mercaptan, and 1,2-dimethylenecyclohexane was introduced. The reactor was flushed with nitrogen prior to charging the ingredients. The temperature was adjusted to 50° C. and maintained at that level and the reactor contents agitated throughout the polymerization period. At the conclusion of the reaction the latex was coagulated by the brine-alcohol method and stabilized with 5 parts phenyl-beta-naphthylamine. The product was dried in vacuo at 50° C. The results are tabulated below:

| Time, Hours | Conversion, Per Cent |
|---|---|
| 2 | 3.6 |
| 4 | 7.1 |
| 6 | 14.2 |
| 14.5 | 40.8 |
| 18 | 49.7 |
| 24 | 60.4 |

The resin was thermoplastic, could be milled on a warm mill, and could be pulled into long fibers having high tensile strength.

*Example II*

The polymerization of 1,2-dimethylenecyclohexane was carried out according to the recipe and procedure of Example I except that the styrene was omitted and 100 parts of the monomer was employed. A brittle resin was obtained.

*Example III*

1,2-dimethylenecyclohexane (100 parts) is polymerized at −70° C. in the presence of a catalyst comprising one part aluminum chloride dissolved in ethyl bromide. The product is an oily polymer of value for use in drying oils, plasticizers, and the like.

As will be evident to those skilled in the art, various modifications of this invention can be made, or followed, in the light of the foregoing disclosure and discussion, without departing from the spirit or scope of the disclosure or from the scope of the claims.

We claim:

1. In a process for the production of a polymeric material of high molecular weight by the polymerization of a monomeric material comprising a conjugated diene, the improvement which comprises polymerizing a monomeric material comprising a 1,2-dimethylenecyclohexane having a composition in accordance with the following structural formula:

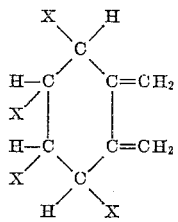

where any X is selected from the group consisting of hydrogen, methyl, ethyl, n-propyl, i-propyl, n-butyl, i-butyl, methoxy, ethoxy, propoxy, butoxy, the total number of carbon atoms in the preceding X radicals being not greater than 12, phenylmethyl, phenylethyl, phenylisopropyl, phenyl-n-propyl, phenylisobutyl, phenyl-n-butyl, phenyl, methylphenyl, ethylphenyl, isopropylphenyl, n-propylphenyl, chlorophenyl, bromophenyl, fluorophenyl, the total number of phenyl-containing radicals in the preceding X radicals being not greater than 3, chloro, bromo, fluoro, in the presence of a polymerization catalyst and under polymerization conditions which will produce a polymeric material of high molecular weight from 1,3-butadiene.

2. A process for the manufacture of a high molecular weight resinous polymer which comprises polymerizing 1,2-dimethylenecyclohexane in aqueous emulsion.

3. In a process for the production of a high molecular weight polymer by the polymerization of a mixture comprising a conjugated diene monomer and another organic monomeric material copolymerizable therewith, the improvement which comprises polymerizing a mixture containing a 1,2-dimethylenecyclohexane and an organic compound containing the vinylidene structure

in the presence of a polymerization catalyst under polymerizing conditions which will produce a polymeric material of high molecular weight from 1,3-butadiene and an organic compound containing said vinylidene structure, and said 1,2-dimethylenecyclohexane having a composition in accordance with the following structural formula:

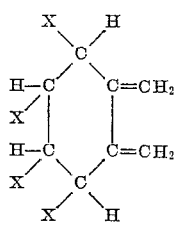

where any X is selected from the group consisting of hydrogen, methyl, ethyl, n-propyl, i-propyl, n-butyl, i-butyl, methoxy, ethoxy, propoxy, butoxy, the total number of carbon atoms in the preceding X radicals being not greater than 12, phenylmethyl, phenylethyl, phenylisopropyl, phenyl-n-propyl, phenylisobutyl, phenyl-n-butyl, phenyl, methylphenyl, ethylphenyl, isopropylphenyl, n-propylphenyl, chlorophenyl, bromophenyl, fluorophenyl, the total number of phenyl-containing radicals in the preceding X radicals being not greater than 3, chloro, bromo, fluoro.

4. A process for producing a high molecular weight resinous polymeric material which comprises polymerizing 1,2-dimethylenecyclohexane in aqueous emulsion in the presence of a catalyst capable of polymerizing 1,3-butadiene under the same conditions to produce a polymer of high molecular weight, and at a temperature within the limits of —20 and 175° F., and recovering said polymeric material from said reaction mixture as a product of the process.

5. A process for producing a high molecular weight resinous polymeric material which comprises copolymerizing 1,2-dimethylenecyclohexane with a polymerizable aliphatic conjugated diolefin, effecting such copolymerization in aqueous emulsion at a temperature within the limits of —20 to 175° F., in the presence of a catalyst capable of polymerizing 1,3-butadiene under the same conditions to produce a polymer of high molecular weight, and recovering said polymeric material from the reaction mixture as a product of the process.

6. A method for making a high molecular weight thermoplastic resinous polymeric material having fiber-like tendencies and capable of being drawn into fibers having high tensile strength, comprising reacting 1,2-dimethylenecyclohexane with styrene in aqueous emulsion in the presence of potassium persulfate as a catalyst, at a temperature within the limits of —20 and 175° F., and recovering said thermoplastic product from the reaction mixture as a product of the process.

7. A new composition of matter consisting of a high molecular weight brittle resinous material prepared by the polymerization of a material consisting of 1,2-dimethylenecyclohexane as the polymerizable constituent in aqueous emulsion in the presence of potassium persulfate as a polymerization catalyst, at a temperature within the limits of —20 to 175° F.

8. A new composition of matter consisting of a high molecular weight resinous thermoplastic polymeric material capable of being drawn into long fibers having high tensile strength, and prepared by copolymerization of 1,2-dimethylenecyclohexane with styrene in aqueous emulsion in the presence of potassium persulfate as a catalyst at a temperature within the range of —20 to 175° F.

9. The process of claim 4 wherein said organic compound is an aryl olefin.

10. The process of claim 4 wherein said organic compound is an open-chain conjugated diolefin.

JOHN E. WICKLATZ.
JAMES N. SHORT.

REFERENCES CITED

The following references are of record in the file of this patent:

UNITED STATES PATENTS

| Number | Name | Date |
| --- | --- | --- |
| 2,445,733 | Radcliffe et al. | July 20, 1948 |
| 2,460,606 | Stewart | Feb. 1, 1949 |

OTHER REFERENCES

Haworth, Journ. Chem. Soc. (London) 103, 1242–50 (1913).